United States Patent Office 3,383,284
Patented May 14, 1968

3,383,284
COSMETIC COMPOSITIONS CONTAINING CYCLIC $C_{18}$ AND $C_{20}$ ALCOHOLS
Edward W. Bell and John C. Cowan, Peoria, Ill., assignors to the United States of America as represented by the Secretary of Agriculture
No Drawing. Original application Mar. 10, 1964, Ser. No. 350,917. Divided and this application June 19, 1964, Ser. No. 393,798
3 Claims. (Cl. 167—91)

ABSTRACT OF THE DISCLOSURE

Rapidly absorbable cosmetic creams and lotions that are highly resistant to the development of rancidity and that do not require the masking of odoriferous constituents are provided by replacing the conventional lanolin and cetyl alcohol components with disubstituted cyclohexane type saturated $C_{18}$–$C_{20}$ alcohol mixed isomers from the catalytic reduction of the corresponding vegetable oil-derived saturated cyclic acids.

This application is a divisional of applicants' copending application S.N. 350,917, filed Mar. 10, 1964.

A nonexclusive, irrevocable, royalty-free license in the invention herein described, throughout the world for all purposes of the United States Government, with the power to grant sublicenses for such purposes, is hereby granted to the Government of the United States of America.

This invention relates to novel very low melting, odorless $C_{18}$ and $C_{20}$ saturated cyclic alcohols (disubstituted cyclohexanes) that exhibit unobvious properties in cosmetic preparation such as body lotions and hand creams.

More specifically, this invention relates to novel liquid alcohols, which are prepared by catalytically reducing the linolenate-derived saturated $C_{18}$ cyclic acids of Scholfield et al., JOACS 36: 631 (1959) or the corresponding $C_{20}$ ethylene adducts of Beal, U.S. Patent No. 3,005,840. We have also discovered that our odorless saturated cyclic alcohols may be advantageously substituted in whole or in part for the distinctly odoriferous palmityl (cetyl) alcohol that is a conventional constituent of cosmetic creams and lotions to provide cosmetics that require little if any masking and to give creams that have an appealingly softer texture and an exceptionally rapid, lanolin-like absorption by the skin. Our cyclic alcohols which are storage stable and not readily subject to oxidative deterioration may also be substituted for lanolin to provide rapidly absorbable cosmetics that are free of lanolin's susceptibility to rancidity.

Also, as taught and specifically claimed in copending and commonly assigned application S.N. 350,925 of Theile et al., now U.S. Patent No. 3,287,223, when substituted for, e.g., spermaceti or other conventional fatty alcohol, fatty acid, or fatty ester in an aluminum oxychloride-containing antiperspirant formulation, our novel cyclic alcohols eliminate the objectionable tacky sensation caused by the aluminum salt astringent.

One object of our invention is the preparation of stable, high molecular weight, very low-melting alcohols having no unsaturation. Another object is the preparation of odorless liquid alcohols that are not only very rapidly absorbed by the skin but which also appear to improve the absorption of the other constituents of a cosmetic emulsion. The subjective and objective comments of a test panel clearly indicated an improved feel and texture and an excellent emollient action.

The above and other objects will be understood more clearly by reference to the following specification and claims.

Our novel $C_{18}$ and $C_{20}$ saturated cyclic alcohols are isomeric mixtures having the following structures:

I. 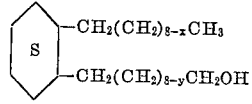

where $(x+y)=8$

II. 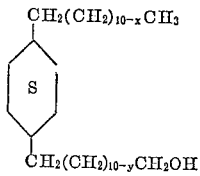

where $(x+y)=10$

The starting materials for our unique alcohols are the known crude or purified isomeric mixtures of the vegetable oil-derived $C_{18}$ saturated cyclic acids (vicinally disubstituted cycohexanes) having the formula

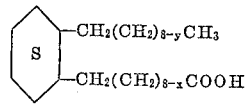

where $x+y=8$ and the corresponding $C_{20}$ ethylene adducts formed when ethylene is introduced during the cyclization reaction. In the latter material, however, the ring is substituted predominantly in the 1,4 positions instead of in the above indicated vicinal positions, and the saturated cyclic monocarboxylic acid mixture then consists predominantly of isomers having the structure

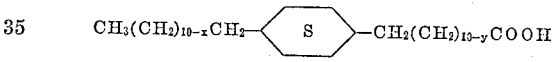

where $x+y=10$.

The crude saturated cyclic acid starting materials are mixtures comprising about 40 percent of purifiable cyclic acid monomers along with about 53 percent of byproduct stearic acid and about 7 percent of palmitic acid.

Moreover, since our novel cyclic alcohols are formed by catalytic reduction, it is not necessary to limit the starting materials to the $C_{18}$ and $C_{20}$ saturated cyclic acids or crudes thereof. Esters of the cyclic acids, and more economically the precursor unsaturated cyclohexadiene and cyclohexene type acids can be directly reduced to the saturated cyclic alcohols, and the same is true of their alkyl, e.g., methyl ester analogs. Furthermore, it is not necessary to isolate the above starting materials from their crudes prior to the catalytic reduction since terminal isolation is practicable. It will be appreciated that when the copper chromite-catalyzed reduction is applied to a crude cyclic acid material, the associated aliphatic acids (stearic, oleic, palmitic, unreacted linoleic, linolenic after inciden reduction of mono, di, and triene unsaturation) are also reduced to the corresponding alcohols so that the final crude is a mixture of the $C_{18}$ or the $C_{20}$ cyclic alcohol isomers and saturated aliphatic alcohols. Since the byproduct aliphatic alcohol constituents in the crude cyclic alcohol mixtures are rather conventional components of cosmetic formulations, the lower cost of the crude cyclic alcohol products may result in their being preferred by industry over the pure cyclic acid isomeric mixtures.

Examples 1–4 show the preparation of the ester intermediates which are then catalytically reduced to the corresponding saturated alcohols as shown in Examples 5–8. Examples 9 and 10 show the direct reduction of the cyclic acids to the cyclic alcohols. Examples 11–20 are presented to show cosmetic formulations in which our novel cyclic alcohols have been substituted for the conventional cetyl alcohol and/or for lanolin. Table I provides chemical and physical data on our cyclic alcohol products.

EXAMPLE 1

Crude $C_{18}$ cyclic acid monomer material (250 g.) prepared by alkali cyclization of linseed oil and comprising 40 percent unsaturated $C_{18}$ cyclic acid isomers along with 52 percent $C_{18}$ aliphatic acids (stearic, oleic, unreacted isometric linolenic and linoleic) and 8 percent palmitic acid were refluxed for 2 hours with 200 ml. absolute methanol, 100 ml. dimethoxypropane, and 1 ml. concentrated HCl. The mixed methyl esters (255.6 g.) were recovered and then flash distilled at 0.1 mm. Hg pressure to give 255.3 g. of the mixed ester product.

EXAMPLE 2

Purified hydrogenated, i.e., saturated $C_{18}$ cyclic acid monomers (183.4 g.) that were freed of dimeric and polymeric materials by flash distillation after acidification of the crude acids and of aliphatic acids by low temperature crystallization from acetone, were refluxed with 500 ml. absolute methanol and 4 ml. concentrated $H_2SO_4$; 190.2 g. of essentially pure methyl esters of the saturated $C_{18}$ cyclic acid isomers were recovered by flash distillation of 0.1 mm. Hg.

EXAMPLE 3

A crude $C_{20}$ unsaturated ethylene adduct mixture (501.7 g.) from the cyclization of soybean oil fatty acids in the presence of ethylene, see Friedrich et al., JOACS 39: 420 (1962) was refluxed with 1400 ml. absolute methanol and 10 ml. concentrated $H_2SO_4$. The crude product comprising 46.9 percent by weight of esterified unsaturated $C_{20}$ cyclic acid methyl esters was recovered and flash distilled at 0.1–0.2 mm. pressure (yield 464 g. of the methyl esters of the mixed $C_{20}$ cyclic and the aliphatic acids).

EXAMPLE 4

The $C_{20}$ ethylene adduct (632 g.) of unsaturated acid product from substantially (96%) pure linoleic acid, see Friedrich et al., JOACS 39, ibid, was refluxed with 1700 ml. absolute methanol and 12.5 ml. concentrated $H_2SO_4$. Flash distillation of the esters gave 582 g. of unsaturated $C_{20}$ cyclic acid methyl ester product analyzing 83.6 percent methyl ester of the $C_{20}$ unsaturated cyclic acids, 6.8 percent of isomeric methyl linoleate, 3.2 percent of methyl stearate, 4.2 percent of methyl oleate, and 2.2 percent of methyl palmitate.

Substantially identical yields were obtained when the sulfuric acid catalyst was replaced by boron trifluoride etherate or by a hydrogen chloride-dimethoxy propane catalyst system.

EXAMPLE 5

A 500 ml. stainless steel autoclave equipped with a magnetic stirrer, pressurized gas admission means, and heating mantle was charged with 200 g. of the crude $C_{18}$ unsaturated cyclic methyl ester mixture of Example 1 and 20 g. (10% by weight) of a commercial copper chromite catalyst comprising 40 percent CuO, 47 percent $Cr_2O_3$, and 10 percent BaO. After flushing, the autoclave was pressurized with hydrogen to 2100 p.s.i. at room temperature and then rapidly heated with stirring to 280° C. At 145° C. and 2,525 p.s.i., a rapid uptake of hydrogen began. During the third (final) hour of reaction at 280° C. the hydrogen uptake was almost negligible. After cooling, the contents were diluted with 200 ml. acetone and the catalyst removed by filtration on a steam-heated funnel. The acetone was stripped off, and the alcohols were flash distilled using a nitrogen sweep at 0.07–0.14 mm. and a steam-heated condenser; 168.2 g. of a distilled fraction boiling at 118°–168° C. and representing a 98 percent conversion of the esters of both the $C_{18}$ cyclic acids and the aliphatic acids to the saturated alcohols was obtained along with 15.7 g. of residue.

EXAMPLE 6

190 g. of the methyl esters of purified saturated $C_{18}$ cyclic acid isomers of Example 2 were reduced in the apparatus of Example 5. Since the ring portion of the cyclic acid esters was already saturated, the reaction did not require additional hydrogen for that purpose. Upon stripping the acetone there remained 155 g. of saturated $C_{18}$ cyclic alcohol isomers. Distillation gave 1.7 g. of a fraction boiling at 103°–129° C./0.15 mm.; 142.9 g. of a fraction boiling at 129°–152° C./0.15 mm.; and 6.8 g. of residue. Because the main fraction showed only 69 percent conversion of ester to alcohol (by hydroxyl determination), the alcohols were redistilled in a vacuum-jacketed Vigreux column. The first fraction (18.5 g.) in a vacuum-jacketed Vigreux column. The first fraction (18.5 g.) boiling at 90°–129° C./o.07 mm. had a refractive index $n_D^{30}$ of 1.4638 and by GLC analysis represented a 79 percent conversion of ester to alcohol along with the formation of 21 percent hydrocarbon. The second fraction (64.9 g.) boiling at 129°–134° C./0.07 mm. and representing a 98.8 percent conversion had a refractive index of 1.4685. The third fraction (44.8 g.) boiling at 134°–138° C./0.07 mm. had a refractive index of 1.4694. Since GLC analysis showed the second and third fractions to be identical, they were combined, $n_D^{30}$ 1.4689.

EXAMPLE 7

450 g. of the mixed methyl esters of the $C_{20}$ unsaturated cyclic acid mixture of Example 3 (46.9 percent $C_{20}$ cyclic acid methyl esters, 6.6 percent unreacted conjugated methyl esters, 6.6 percent unreacted conjugated linoleate, 2.60 percent methyl oleate, 5.4 percent methyl stearate, and 15.1 percent methyl palmitate) were placed in a 1000 ml. stainless steel autoclave along with 45 g. of copper chromite catalyst and then treated exactly as in Example 5. Distillation of the crude alcohol mixture (414.3 g.) yielded 8 g. of a fraction boiling at 90°–131° C./0.04 mm.; 379 g. boiling at 131°–180° C./0.04–0.05 mm.; and 32.3 g. residue. The conversion to the saturated alcohols was 96.5 percent.

EXAMPLE 8

500 g. of the mixed methyl ester product of Example 4 and containing 83.6 percent of the esterified unsaturated $C_{20}$ cyclic acids, 6.8 percent unreacted conjugated methyl linoleate, 3.2 percent methyl stearate, 4.2 percent of methyl oleate, and 2.2 percent methyl palmitate were hydrogenated in the presence of 42 g. of copper chromite catalyst exactly as in Example 7. Distillation of the alcohols (441.8 g.) gave 1.8 g. boiling at 100°–130° C./0.1 mm.; 389 g. boiling at 130°–180° C./0.1–0.2 mm.; and 40.2 g. residue. Conversion of ester to alcohol was 93 percent.

EXAMPLE 9

A 2 liter autoclave of the type used in Example 5 was charged with 400 g. of crude unsaturated $C_{18}$ cyclic acid material obtained by an alkali cyclization of linseed oil. This crude material comprised 37.4 percent $C_{18}$ unsaturated cyclic acid monomers and 9.5 percent polymeric residue. After introducing 40 g. of commercial copper chromite catalyst, the autoclave was flushed and pressurized with hydrogen to 2100 p.s.i. at room temperature, followed by a rapid heating to 280° C. A sample taken at 5 hours had an iodine value of 20 and acid value of 10.5; at 9 hours of reduction the respective values were 14 and 6; and at 11 hours they were 14 and less than 1. The crude cyclic alcohols (370 g.) were recovered as described in Example 5, using 400 ml. acetone. To determine whether there was residual unsaturation, 112 g. of the acetone-free crude alcohols were flash distilled, yielding 108.5 g. of a fraction having an iodine value of 6.5 and 2.4 g. of a residue with an iodine value of 49.5. After recombing the distillate fractions and the remaining crude alcohols, 36 g. of fresh catalyst was added to the 360 g.

of crude cyclic alcohol mixture, and hydrogenation was resumed for 4 hours at 280° C. Following the recovery of the crude saturated $C_{18}$ cyclic alcohols (322.8 g.) having an iodine value of 2.7 and acid value of 0.6, distillation of a 176 g. portion thereof gave 7.5 g. of a fraction boiling at 90–120° C./0.15 mm.; 155 g. of a fraction boiling at 120°–160° C./0.15 mm.; and 12.2 g. of residue. GLC analysis of the first fraction showed it to consist of 36 percent saturated $C_{18}$ cyclic alcohols, 40.6 percent stearyl alcohol, 14.3 percent palmityl alcohol, and 9.1 percent hydrocarbon. The main fraction (96 percent conversion of acids to alcohols) having an acid value of 0.65, iodine value of 0.48, and melting at 38–46° C. analyzed 37.8 percent saturated $C_{18}$ cyclic alcohol isomers, 57.5 percent stearyl alcohol, and 4.7 percent palmityl alcohol.

EXAMPLE 10

The glass liner of a 300 ml. high pressure rocker autoclave was charged with 63 g. of the pure $C_{29}$ unsaturated cyclic acid obtained by the 1,4-addition of ethylene to 9,11-t,t-octadecadienoic acid and 6.3 g. of copper chromite catalyst. After pressurizing with hydrogen to 2100 p.s.i. at room temperature, the autoclave was heated to 280° C. and the contents reacted for 4¾ hours. After cooling and diluting the contents with 200 ml. acetone, the catalyst was filtered off. Distillation of the product (50 g.) gave 4 g. of a fraction boiling at 108–150° C./0.07–0.1 mm., $n_D^{30}$ 1.4650; 34 g. of a fraction boiling at 150–165° C./0.1–0.2 mm., $n_D^{30}$ 1.4668; and 4 g. residue. GLC analysis of the main fraction showed only extremely faint traces of stearyl alcohol and hydrocarbons.

TABLE I

| Saturated cyclic alcohols from— | Cyclic, Percent | OH, Percent | I.V. | Acid V. | M.P., ° C. | Viscosity (cps.), 60° C. |
| --- | --- | --- | --- | --- | --- | --- |
| $C_{18}$ linseed-derived monomers (crude) | 40 | 6.14 | 0.7 | 0.45 | 42–53 | 11.65 |
| $C_{18}$ (purified) | 100 | 6.2 | 1.1 | 0.45 | [1] –40 | 18.7 |
| $C_{20}$ soybean monomers (crude) | 47.9 | 5.8 | 1.3 | 0.56 | 37–51 | 14.8 |
| $C_{20}$ (from ethylene adduct of methyl linoleate) | 80.2 | 5.4 | 1.0 | 0.47 | 23–25 | 18.7 |
| $C_{20}$ from ethylene adduct of pure 9,11-t,t-octadecadienoic acid | 100 | 5.5 | 0.3 | 0.99 | 22–25 | 28.0 |

[1] Pour point.

In the following standard hand creams and body lotion formulations shown in Sagarin, "Cosmetics, Science and Technology," published 1957 by Interscience Publ. Co., Inc., New York, our crude or highly pure $C_{18}$ or $C_{20}$ cyclic alcohols have been substituted, as shown, for cetyl alcohol or for lanolin or both. The emulsions were prepared by the conventional procedure of separately preparing the phases, slowly adding the oil phase (Part A) at 70–75° C. to the aqueous (external) phase (Part B) at the same temperature with stirring that was maintained until room temperature was reached. The viscosities of the formulations containing the $C_{20}$ cyclic alcohol materials were generally somewhat lower than in the corresponding formulations employing the $C_{18}$ cyclic alcohols and this difference was greater in the non-ionic formulations. However, the slight differences in viscosity did not noticeably affect the very rapid absorption nor the superior esthetic qualities. Examples 11 and 12 are cationic, examples 13–17 are non-ionic, and Examples 18–20 are anionic non-soap formulations. All percentages refer to parts by weight.

EXAMPLE 11

Part A: Percent
Crude $C_{18}$ saturated cyclic (40%) alcohol of Example 5 (substituted for cetyl alcohol) ___ 15
Paraffin _____ 10
Light mineral oil _____ 5
Part B:
Cetyl trimethyl ammonium chloride _____ 0.5
$H_2O$ _____ 69.5

EXAMPLE 12

Part A: Percent
Crude $C_{20}$ cyclic (47.6%) alcohol of Example 7 (in place of cetyl alcohol) _____ 15
Paraffin _____ 10
Light mineral oil _____ 5
Part B:
Cetyl trimethyl ammonium chloride _____ 0.5
$H_2O$ _____ 69.5

EXAMPLE 13

Part A: Percent
Crude $C_{18}$ linseed cyclic (40%) alcohol of Example 5 (in place of cetyl alchol) _____ 16.0
Lanolin _____ 16.0
Isopropyl myristate _____ 16.0
Part B:
Isooctylphenyl-polyethoxy ethanol _____ 4.0
$H_2O$ _____ 48.0

EXAMPLE 14

Part A: Percent
Crude $C_{20}$ soybean cyclic (47.6%) alcohol of Experiment 7 (substituted for cetyl alcohol) _ 16.0
Lanolin _____ 16.0
Isopropyl myristate _____ 16.0
Part B:
Isooctylphenyl-polyethoxy ethanol _____ 4.0
$H_2O$ _____ 48.0

EXAMPLE 15

Part A: Percent
Crude $C_{18}$ linseed cyclic (40%) alcohol of Example 4 (substituted for cetyl alcohol and lanolin) _____ 32.0
Isopropyl myristate _____ 16.0
Part B:
Isooctylphenyl-polyethoxy ethanol _____ 4.0
$H_2O$ _____ 48.0

EXAMPLE 16

Part A: Percent
Crude $C_{18}$ linseed cyclic (40%) alcohol of Example 5 (substituted for lanolin) _____ 16.0
Cetyl alcohol _____ 16.0
Isopropyl myristate _____ 16.0
Part B:
Isooctylphenyl-polyethoxy ethanol _____ 4.0
$H_2O$ _____ 48.0

EXAMPLE 17 (LOTION)

Part A: Percent
Crude soybean $C_{20}$ cyclic (47.6%) alcohol of Example 7 (substituted for lanolin) _____ 16.0
Cetyl alcohol _____ 16.0
Isopropyl myristate _____ 16.0
Part B:
Isooctylphenyl-polyethoxy ethanol _____ 4.0
$H_2O$ _____ 48.0

EXAMPLE 18 (LOTION)

Part A: | Percent
--- | ---
Crude (40%) linseed cyclic (40%) alcohols of Example 5 | 10.0
Sodium cetyl sulfate | 2.0
Stearic acid | 8.0
Stearyl alcohol | 3.0

Part B:
Glycerol | 8.0
Sodium cetyl sulfate | 1.0
$H_2O$ | 68.0

EXAMPLE 19

Part A: | Percent
--- | ---
Crude soybean $C_{20}$ cyclic (47.6%) alcohols of Example 7 | 10.0
Sodium cetyl sulfate | 2.0
Stearic acid | 8.0
Stearic alcohol | 3.0

Part B:
Glycerol | 8.0
Sodium cetyl sulfate | 1.0
$H_2O$ | 68.0

EXAMPLE 20

Part A: | Percent
--- | ---
Purified $C_{18}$ saturated cyclic alcohols of Example 6 | 10.0
Sodium cetyl sulfate | 2.0
Stearic acid | 8.0
Stearyl alcohol | 3.0

Part B:
Glycerol | 8.0
Sodium cetyl sulfate | 1.0
$H_2O$ | 68.0

It is clear that those skilled in the cosmetic art can make many obvious adjustments and modifications based on the present disclosure without departing from the spirit of our invention.

We claim:

1. A hand cream having the following percentage composition

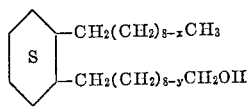

wherein $(x+y)=8$

| | Percent |
|---|---|
| Paraffin | 10 |
| Light mineral oil | 5 |
| Cetyl trimethyl ammonium chloride | 0.5 |
| $H_2O$ | 69.5 |
| | 100.0 |

2. A hand cream having the following percentage composition

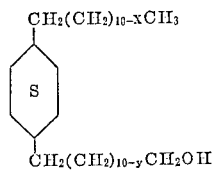

wherein $(x+y)=10$

| | Percent |
|---|---|
| Paraffin | 10 |
| Light mineral oil | 5 |
| Cetyl trimethyl ammonium chloride | 0.5 |
| $H_2O$ | 69.5 |
| | 100.0 |

3. A hand cream having the following percentage composition

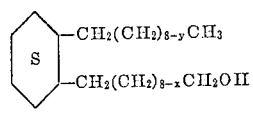 10.0 wherein $(x+y)=8$

| | Percent |
|---|---|
| Sodium cetyl sulfate | 2.0 |
| Stearic acid | 8.0 |
| Stearyl alcohol | 3.0 |
| Glycerol | 8.0 |
| Sodium cetyl sulfate | 1.0 |
| $H_2O$ | 68.0 |
| | 100.0 |

References Cited

UNITED STATES PATENTS 2,815,388 12/1957 Inhoffen et al. _____ 260—617
3,287,223 11/1966 Theile et al. _____ 167—90

ALBERT T. MEYERS, *Primary Examiner.*

D. R. MAHANAND, *Assistant Examiner.*

UNITED STATES PATENT OFFICE
CERTIFICATE OF CORRECTION

Patent No. 3,383,284                                          May 14, 1968

Edward W. Bell et al.

It is certified that error appears in the above identified patent and that said Letters Patent are hereby corrected as shown below:

Column 4, line 32, "2.60" should read -- 26.0 --.

Signed and sealed this 30th day of September 1969.

(SEAL)
Attest:

Edward M. Fletcher, Jr.
Attesting Officer

WILLIAM E. SCHUYLER, JR.
Commissioner of Patents